UNITED STATES PATENT OFFICE.

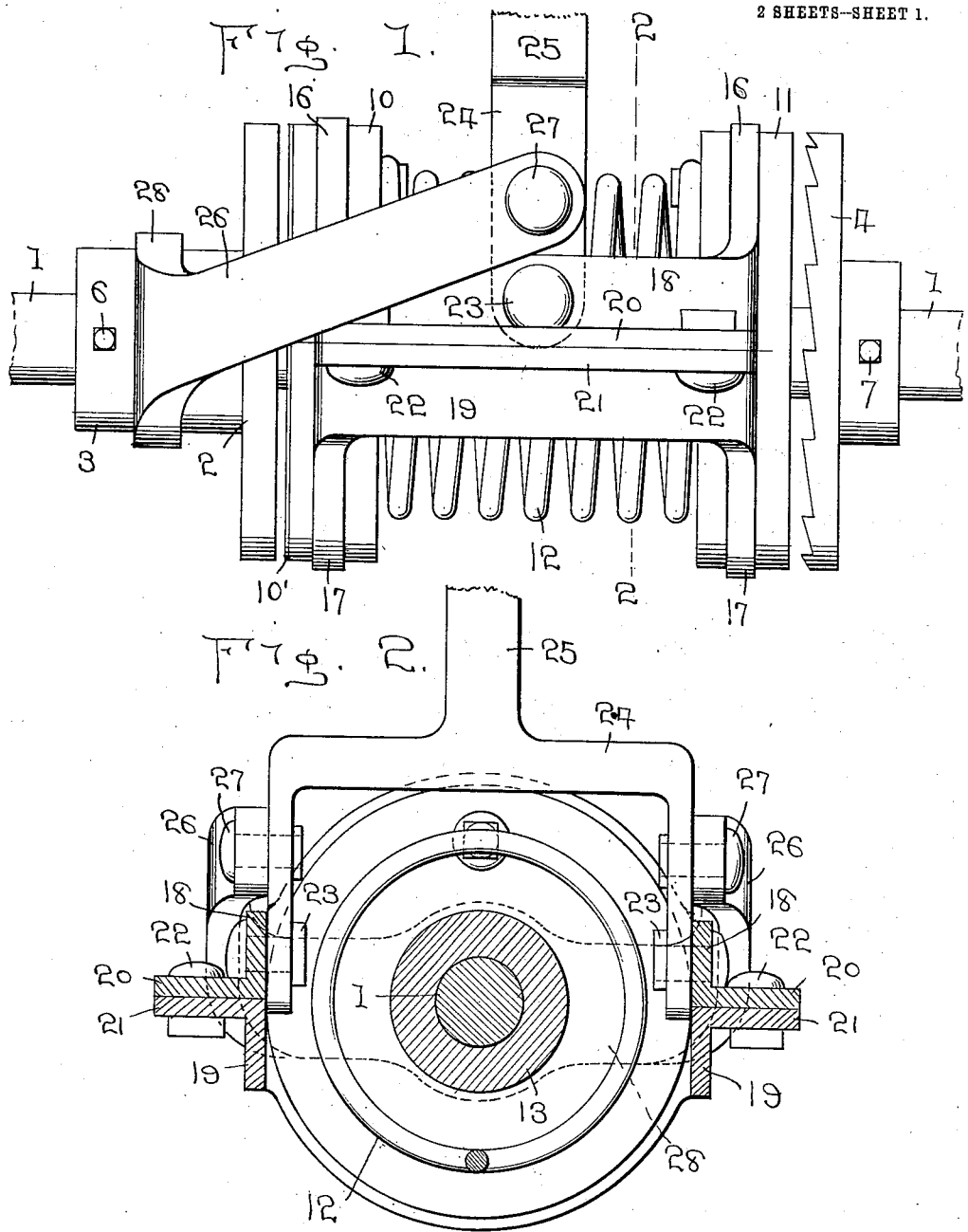

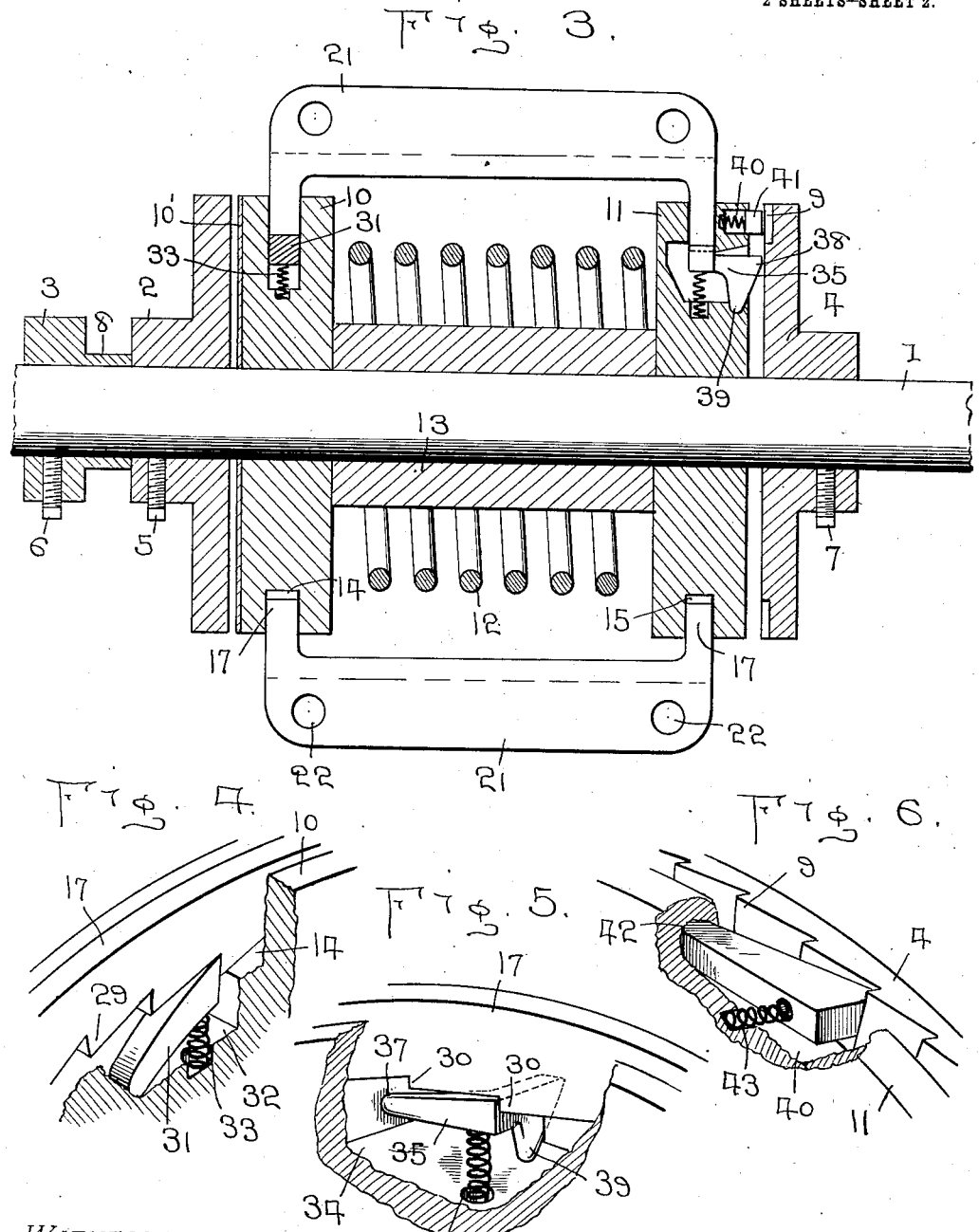

WILLIAM H. WILLIAMS, OF STATESBORO, GEORGIA.

ENGINE-STARTER.

1,024,712.  Specification of Letters Patent.  Patented Apr. 30, 1912.

Application filed January 30, 1912. Serial No. 674,311.

*To all whom it may concern:*

Be it known that I, WILLIAM H. WILLIAMS, a citizen of the United States, residing at Statesboro, in the county of Bulloch and State of Georgia, have invented certain new and useful Improvements in Engine-Starters; and I do hereby declare the following to be a full, clear, and exact description of the invention, such as will enable others skilled in the art to which it appertains to make and use the same.

This invention relates to engines and more particularly to engine starters.

An object of the invention is to provide an engine starter especially adapted for use on engines such as employed upon motor vehicles and to so construct the starter that it may be positioned upon the engine shaft to start the engine without the necessity of cranking the same.

Another object is to provide a spring controlled engine starter which may be wound by rotation of the engine shaft during operation of the engine to store energy to be utilized to start the engine after the same has been stationary without the necessity of cranking the engine.

Other objects and advantages will be hereinafter set forth and pointed out in the specification and claims.

In the accompanying drawings which form a part of this application, Figure 1 is a side elevational view of the starter positioned upon the engine shaft. Fig. 2 is a cross sectional view on the line 2—2 of Fig. 1. Fig. 3 is a longitudinal cross sectional view. Fig. 4 is a slightly enlarged fragmentary view, showing the pawl carried by one of the coöperating disks engaged with the sectional collar surrounding said disk for locking the latter against rotation in one direction. Fig. 5 is a similar view showing the pawl carried by the other disk and engaged with the collar surrounding said disk for locking the latter against rotation with the first disk and Fig. 6 is an enlarged fragmentary view, showing the operating pawl engaged with the ratchet teeth of the power transmitting disk rigidly mounted upon the shaft.

Referring more particularly to the drawings in which similar reference numerals designate corresponding parts throughout the several views, 1 represents a portion of an engine shaft upon which are rigidly mounted the friction disk 2, spacing collar 3 and power transmitting disk 4, rigidly secured in position upon the shafts 1 by means of set screws 5, 6 and 7 respectively. The spacing collar 3 has a reduced or neck portion 8 between the collar proper 3 and the hub of the friction disk 2, the neck portion 8 having a diameter much less than that of the collar proper 3 and the hub of the friction disk 2. It will be understood that the set screws 5 and 7 are positioned through the hubs of the disks 2 and 4 respectively. Positioned between the flat faces of the friction disk 2 and the power transmitting disk 4, which latter is provided with ratchet teeth 9 upon its flat face, near the edge thereof, are the coöperating disks 10 and 11 to which are secured the opposite ends of the coiled controlling spring 12 positioned around the sleeve 13, which sleeve 13 serves to space the coöperating disks 10 and 11, it being understood that the sleeve 13 and coöperating disks 10 and 11 are properly mounted upon the shaft 1, for free rotation thereon.

The disks 10 and 11 are provided with circumferential grooves 14 and 15 respectively in their peripheries. Within each of the circumferential grooves 14 and 15 are positioned semi-circular upper and lower sectional collar members 16 and 17 which are connected at their opposite ends by the horizontal connecting plates 18 and 19 respectively. The horizontal connecting plates 18 and 19 are provided with flanges 20 and 21 respectively which are suitably bolted together by means of bolts 22, thus securing the upper and lower semi-circular sectional collar members 16 and 17 to one another and holding the same within the circumferential grooves 14 and 15, the sectional collar members 16 and 17 forming complete collars around the disks 10 and 11.

Pivoted upon the bolts 23 passed through the horizontal connecting plates 18 are the lower ends of the U-shape shifting lever 24 which has the handle 25 projecting upwardly therefrom. Pivoted to each depending arm of the U-shape lever 24 above the bolts 23 and above the horizontal connecting plates 18 are the free ends of the parallel arms 26, which are pivoted by means of the pivot bolts 27. The opposite ends of the arms 26 are connected by the transverse connecting portion 28 which is widened at its central portion and provided with a suitable opening for engagement around the neck 8 of the spacing collar 3. The pivot bolts 27 passed through the free ends of the parallel arms 26 and through the depending arms of the U-shape lever 24 form a pivot point for the lever 24 to allow the same to shift the horizontal connecting plates 18 and 19 back and forth as required to move the coöperating disks 10 and 11 to their inoperative position (as shown in Figs. 1 and 3) or in engagement with the friction disk 2 for winding the spring 12, or in engagement with the power transmitting disk 4 for the operation of the starter to rotate the shaft 1 and thus start the engine.

The inner faces of the collars formed by the sectional collar members 16 and 17 working within the grooves 14 and 15 are provided with the ratchet teeth 29 and 30 respectively and resiliently held in engagement with the ratchet teeth 29 of the collar within the groove 14 is one end of the pawl 31 which is positioned within the recess 32 provided therefor in the disk 10 and has a suitable spring 33 beneath its ratchet engaging end to resiliently hold the latter in engagement with the ratchet teeth 29.

A recess 34, similar to the recess 32 is provided in the disk 11 to accommodate the pawl 35, beneath the ratchet teeth 30. The pawl 35 is normally held in engagement with the teeth 30 by means of a spring 36 pressing upwardly against said pawl at the corner of the latter. The pawl 35 is of substantially L-shape form in general outline and has one end pointed and engaged in a socket formed therefor in one vertical wall of the recess 34, as shown at 37. The other end of the pawl 35 is projected through the side of the disk 11, as shown at 38, and adapted for engagement against the flat face of the power transmitting disk 4. The pawl 35 is provided with a downwardly projected lug 39 near the projected end 38, which lug 39 is rounded and rests in the socket opening provided therefor in the floor of the recess 34. When the projected end 38 of the pawl 35 is engaged against the face of the power transmitting disk 4 and pressed inwardly by the latter until it is about flush with the face of the disk 11, the pawl 35 will be rocked upon its end 37 and lug 39 and the corner of said pawl will be thrown downwardly from engagement with the ratchet teeth 30, as will be later more clearly understood.

Positioned within a suitable recess 40 in the disk 11, outwardly of the recess 34, is the power transmitting disk engaging pawl 41 which has its smaller end seated in a suitable socket opening 42 within one end wall of the recess 40 while its opposite end is resiliently held outwardly of the face of the disk 11 by means of the spring 43 and is adapted for engagement with the ratchet teeth 9 carried by the power transmitting disk 4 to rotate the latter for transmitting the energy stored in the spring 12 to the shaft 1 for starting the engine.

The starter is shown in Figs. 1 and 3 in inoperative position. When it is desired, however, to wind the spring 12 during the operation of the engine, the handle 25 of the lever 24 is swung in the proper direction to move the disk 10, which is preferably provided with a plate 10' upon its outer face, into engagement with the friction disk 2. Owing to the friction disk 2 being rigid with the shaft 1, as the latter rotates the disk 10 will be compelled to rotate with the shaft to wind the spring 12, the disk 11 being held stationary by means of the pawl 35 engaged against the ratchet teeth 30 and the pawl 31 preventing backward rotation of the disk 10. After the spring 12 has been wound to the desired tension, the lever 24 is swung to place the disks 10 and 11 in their inoperative positions spaced from the disks 2 and 4. After the engine has been idle and it is desired to start the latter, all that is necessary is to move the handle 25 of the lever 24 to slide the disks 10 and 11 and sleeve 13 toward the power transmitting disk 4 until the disk 11 is in engagement with the disk 4. The pawl 41 will immediately engage the ratchet teeth 9 upon the disk 4 and as the projected end 38 of the pawl 35 is forced inwardly, disengaging the pawl 35 from the ratchet teeth 30, the disk 11 will be rotated under the influence of the spring 12 to revolve the power transmitting disk 4 and thus rotate the shaft 1 to start the engine.

It will thus be seen that I have provided an engine starter which will readily start an engine and which may be wound for operation by an engine to which it is connected while the latter is running. It will also be evident that this device will be highly efficient and effective in use, and should any of the parts become worn or broken they may be readily replaced at a small cost. Further this starter may be positioned upon the engine shaft proper and will eliminate the necessity of the operator leaving his seat to crank the engine.

What I claim is:—

1. In an engine starter, the combination with an engine shaft, of coöperating disks, means for connecting the coöperating disks, a spring positioned between the disks and having its opposite ends secured thereto, means connected with the connecting means for shifting the disks longitudinally of the shaft, means carried by the shaft for rotating one disk to wind the spring, means for holding the other disk stationary during the winding of the spring, means for releasing the second disk to allow the same to be rotated by the spring during unwinding of the latter, and means for transmitting rotary motion from the last disk to the shaft.

2. An engine starter comprising coöperating disks upon a shaft, collars carried by said disks, means for connecting the collars, means for shifting the collars and disks longitudinally upon the shaft, a spring positioned between the disks and connected to the latter, means carried by the shaft for rotating one of the disks and thus winding the spring, means for preventing reverse rotation of the disk, a power transmitting disk carried by the shaft, one of the coöperating disks being adapted for engagement against the power transmitting disk to rotate the latter during unwinding of the spring to impart rotary motion to the shaft.

3. An engine starter comprising the combination with a shaft, of coöperating disks, collars carried by the disks, means for connecting the collars, a lever connected with the connecting means, means for forming a pivot point for the lever, said lever being adapted to shift the connecting means longitudinally of the shaft to move the collars and disks, a spring between the disks and having one end connected with each disk, a friction disk carried by the shaft for rotating one of the coöperating disks, means for preventing backward rotation of the last mentioned disk, means for holding the other disk of the coöperating disks stationary during the rotation of the first disk by the friction disk to wind the spring, means for releasing the second disk of the coöperating disks to allow the same to be rotated by the spring, and means for transmitting the motion of the second disk to the shaft to rotate the latter during the unwinding of the spring.

4. A device of the class described comprising coöperating disks positioned upon a shaft, means for spacing the disks from one another, each of the coöperating spaced disks having a circumferential groove in its periphery, collars within the grooves, means for connecting the collars, a lever pivoted to the connecting means, means connected with the lever and positioned over the shaft to form a pivot point for the lever, said lever being adapted to shift the connecting means, collars and coöperating disks longitudinally of the shaft, a spring between the coöperating disks and connected with the latter, a friction disk carried by the shaft outwardly of one of the coöperating disks, a power transmitting disk having ratchet teeth rigidly secured to the shaft outwardly of the other coöperating disk, means carried by one coöperating disk, and collar for preventing backward rotation of the coöperating disk, and an operating pawl carried by one of the coöperating disks for engagement with the teeth of the power transmitting disk to revolve the latter.

In testimony whereof I have signed my name to this specification in the presence of two subscribing witnesses.

WILLIAM H. WILLIAMS.

Witnesses:
C. A. NEALE,
W. F. FITZ GERALD.

Copies of this patent may be obtained for five cents each, by addressing the "Commissioner of Patents, Washington, D. C."